US011157587B2

(12) United States Patent
Hajduczenia

(10) Patent No.: US 11,157,587 B2
(45) Date of Patent: Oct. 26, 2021

(54) CONTENT LOADING TO PROVIDE ENHANCED VIEWING EXPERIENCE

(71) Applicant: CHARTER COMMUNICATIONS OPERATING, LLC, Saint Louis, MO (US)

(72) Inventor: Marek Hajduczenia, Castle Rock, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 180 days.

(21) Appl. No.: 16/162,802

(22) Filed: Oct. 17, 2018

(65) Prior Publication Data

US 2020/0125683 A1 Apr. 23, 2020

(51) Int. Cl.
G06F 16/957 (2019.01)
G06F 16/958 (2019.01)
G06F 3/0484 (2013.01)

(52) U.S. Cl.
CPC ...... *G06F 16/9574* (2019.01); *G06F 3/04842* (2013.01); *G06F 16/958* (2019.01); *G06F 16/9577* (2019.01)

(58) Field of Classification Search
CPC .................. G06F 17/00; G06F 16/9574
See application file for complete search history.

(56) References Cited

U.S. PATENT DOCUMENTS

| | | | |
|---|---|---|---|
| 8,302,016 B2* | 10/2012 | Goto | G06F 3/00 |
| 2006/0259585 A1* | 11/2006 | Keohane et al. | G06F 15/16 |
| 2009/0044098 A1* | 2/2009 | Wyler et al. | G06F 17/00 |
| 2014/0095979 A1* | 4/2014 | Meckler et al. | G06F 17/2247 |
| 2014/0250367 A1* | 9/2014 | Ivory et al. | G06F 17/2247 |
| 2017/0257393 A1* | 9/2017 | DeBarros et al. | H04L 29/06 |

* cited by examiner

*Primary Examiner* — James J Debrow
(74) *Attorney, Agent, or Firm* — Armis IP Law, LLC

(57) ABSTRACT

According to one configuration, a user operating a communication device communicates a request for retrieval of content to a server resource. In response to communicating the request, the communication device receives content display information defining how to produce a rendition of the requested content for display on a display screen of the communication device. The display information indicates multiple portions of individually retrievable content in which to populate the rendition of the requested content. The computer device utilizes the priority information to select an order of retrieving the multiple portions to populate the rendition of the requested content.

42 Claims, 15 Drawing Sheets

TEMPLATE INFO 720

DISPLAY INFO 721

CONTENT 122 (D.E. 222) ....... LOCATION #11
CONTENT 123 (D.E. 223) ....... LOCATION #12
CONTENT 124 (D.E. 224) ....... LOCATION #13
CONTENT 125 (D.E. 225) ....... LOCATION #14
...

FIG. 7

CONTENT LOADING TO PROVIDE ENHANCED VIEWING EXPERIENCE

BACKGROUND

Many operations occur between the time a web page is requested (link is clicked on or URL [Uniform Resource Locator] is introduced) and the time the webpage and corresponding individually retrievable display elements completely loads in a respective browser operated by a user. Depending on the circumstances, retrieval of the webpage and corresponding display elements typically takes anywhere from a few milliseconds to several minutes to complete.

There are a handful of general steps that occur between the time a webpage is requested and the time it takes to display the retrieved webpage in a browser on a display screen. For example, retrieval and display of a webpage includes the following general steps:

1. DNS (Domain Name Service) lookup to retrieve a network address of a destination server resource from which to retrieve the webpage
2. Browser sends an HTTP (HyperText Transfer Protocol) request to the destination address
3. Server responds and sends back a requested HTML (Hypertext Markup Language) file (such as a display template of displayable content)
4. Browser begins to render HTML file received in the previous step
5. Browser sends additional requests for objects embedded in the HTML file (CSS [Cascading Style Sheets] files, images, Javascript™, media files, etc.)

In general, steps 1 through 4 result in exchange of a relatively small amount of information; an impact on the website load is minimum.

Step 5 is typically where a client (browser) does almost all of the processing-intensive tasks associated with the rendering and loading content referenced in the HTML file.

Note that all the static and dynamic content referenced in the HTML file is not downloaded during the step 2, 3, 4 host-server exchange, but loaded separately by the client from the indicated source, one by one, cached locally, and prepared for rendering at the end of step 5. This means that a simple HTML file may contain references to hundreds or even thousands of individually retrievable objects (display elements) that need to be loaded by the client, processed, formatted, and rendered before the website is ready to be displayed to the user.

The process of retrieving pieces of content process is quickly performed, i.e., once the HTML is processed, and the client has list of all objects referenced in the HTML and not present in the HTML, the client starts downloading them, usually opening multiple parallel sessions at once, caching the received content locally for further processing.

The process of downloading static and dynamic objects referenced in an HTML file is what takes, effectively, most of the time to render and display the webpage to the client subsequent to submitting a webpage request.

Note that the process of rendering content may be put on hold until all referenced content is downloaded. That is, a webpage may not be displayed incomplete, missing elements, unless a connection to download the given referenced object times out, or the object is not found. Given the length of default time out, this can further degrade user experience by delaying rendering of a requested webpage.

For media-rich websites, containing a large amount of externally loaded content, as well as the sheer volume of dynamic advertising, cookies, and other external files loaded in the process of displaying a website, the time it takes for a conventional webpage to be loaded can easily take several seconds, spiking use of processor and memory resources on the client machine. This delay time is undesirable to a respective user.

BRIEF DESCRIPTION OF EMBODIMENTS

As discussed, there are deficiencies associated with conventional techniques of retrieving portions of content for display on a display screen. For example, in certain instances as mentioned, a user may need to wait until all retrievable display elements are retrieved and processed to complete rendering of a respective webpage for viewing by a user.

Embodiments herein include novel ways of rendering display information on a display screen.

First Embodiments

More specifically, in one embodiment, a display management resource of a computer device (hardware) controls display of content on a display screen. For example, assume that the computer device communicates a request for retrieval of content to a server resource. In response to communicating the request, the display management resource receives content display information from the server resource defining how to produce a rendition of the requested content for display on the target display screen. The display information indicates multiple portions of individually retrievable content (such as objects) in which to populate the rendition of the requested content. The computer device uses priority information to select an order of retrieving the multiple portions and populating the rendition of the requested content.

Note that the content display information may include any suitable information to render one or more images on the display screen. For example, in one embodiment, the content display information defines a template (such as a pre-layout content structure, framework, etc.) to be used to generate a respective webpage for viewing. In such an instance, the display management resource initially produces a template or framework as specified by the content display information, and in accordance with the priority information, populates the template with the multiple portions of individually retrievable content to produce the rendition of the requested content.

Note that the display management resource (or other suitable resource associated with the computer device controlling the display screen) can be configured to dynamically update the priority information to populate the rendition of requested content based on which less-than-all portion (such as a window) of the rendered content has been selected for viewing on the display screen by a user.

According to further embodiments, the priority information can be updated based on any suitable/applicable information. For example, the display management resource (or other suitable resource) can be configured to update the priority information of retrieving individually retrievable content based on a user viewing the display screen.

In one embodiment, the user produces input selecting a window of the rendered content to be displayed on the display screen. The display management resource produces priority information indicating the order of retrieving the multiple portions of individually retrievable content based on a location of the window of the rendered content selected by the user. In other words, in one embodiment, the display management resource uses the location of the window to identify a set of individually retrievable portions of content to be displayed in the window. The display management resource then retrieves the identified set of individually retrievable portions of the content to immediately populate the selected window on the display screen before retrieving and populating other unviewed portions of the content being rendered.

Additional embodiments herein include detecting a newly selected less-than-all portion of the rendition for viewing on the display screen. For example, during retrieval of a respective webpage and prior to rendering of the webpage, a user may move window of viewing to a different portion of the webpage. In response to detecting such a condition, the display management resource (or other suitable resource) updates the priority information to change a priority of retrieving the multiple portions of individually retrievable content based on which less-than-all portion of the rendition is newly selected by the user for viewing on the display screen. As previously discussed, the display management resource initiates retrieval and population of display elements in the selected window first over display elements to be populated outside the window.

Thus, in one embodiment, the priority information can be configured to indicate to retrieve first portions of the multiple portions of individually retrievable content that are needed to populate a currently viewed less-than-all portion of the rendition of requested content on the display screen. Additionally, the priority information can be configured to indicate that the first portions are higher in priority than second portions of the multiple portions of individually retrievable content needed to populate a less-than-all portion of the rendition of requested content currently not viewed on the display screen. Thus, the priority information can be updated to indicate a change on priority of retrieving individually retrievable content.

In accordance with still further embodiments, the rendition of the content produced by the display management resource is a webpage. The user of the computer device may repeatedly, such as on prior occasions, retrieve the webpage for viewing on the display screen. In one embodiment, the priority information used to populate display elements in the webpage being rendered is generated based on a prior history (such as prior occasions) of the user repeatedly viewing a same respective portion of the retrieved webpage. In other words, a request for retrieval of content may be a webpage identifier. The requested content may be a webpage. In one embodiment, the display management resource uses the webpage identifier to retrieve display information that indicates how to produce the webpage. The display management resource (or other suitable resource) produces the priority information to populate display elements in a webpage based on prior habits of a user retrieving the webpage and viewing portions of the rendition of the content (webpage) on the display screen. In such an instance, the display management resource tracks (via habit information) the regions of most interest to the user in the repeatedly retrieved webpage. In one embodiment, the display management resource produces a map mapping the webpage identifier to the priority information indicating portions or regions (and corresponding display elements) of the webpage being of highest interest.

Accordingly, when the user retrieves the webpage again, the display management resource can be configured to retrieve the priority information (assigned to the retrieved webpage) to identify which regions of the corresponding webpage are known to be of highest interest to the user. To accommodate the user, when producing a rendition of the webpage, the display management resource gives highest priority to retrieving populating the webpage with the display elements of highest interest.

In still further embodiments, note that the display management resource can be configured to produce the priority information based on a location of a cursor displayed on the display screen. The location of the cursor is controlled by a user viewing the display screen. In such an instance, in response to identifying a portion of individually retrievable content to be displayed in a vicinity of the cursor, embodiments herein can include updating the priority information to increase a priority of retrieving the identified portion (or portions likely of higher intertest for viewing) for rendering of the requested content. Display elements further away from the cursor are assumed to be of lower interest and are given lower priority.

As an alternative to generating the priority information based on a single user's habits, embodiments herein include monitoring which of the multiple portions of individually retrievable content are of highest interest to multiple users retrieving the content and generating the priority information to indicate the portions of greatest interest amongst multiple users.

Further embodiments herein can include producing the priority information to rank the multiple portions of individually retrievable content based at least in part on a quantity of data to be retrieved to render a respective portion of the multiple portions. For example, if it is known that certain portions of individually retrievable content needed to populate the webpage require high bandwidth to transmit because they contain a large amount of data, such individually retrievable content can be ranked lower for retrieval than content information having less data.

In accordance with further embodiments, the priority information and generation of same is user-configurable. For example, a user can indicate types of content (such as video data) that are of highest interest (and that are to be retrieved and displayed first in the webpage) as well as types of content to de-prioritize (such as types of content that are of lower interest that are to be retrieved last). Thus, the display management resource uses the user generated information as a basis to prioritize a display of content.

Second Embodiments

According to second embodiments, a display management resource associated with a computer device receives content display information indicating multiple portions of individually retrievable content in which to populate a rendition of requested content on a display screen. During rendering, the display management resource receives input produced by a user viewing the display screen. The display management resource utilizes the input to control an order of retrieving and/or rendering of the multiple portions of individually retrievable content to populate the rendition of the requested content.

In one embodiment, the display management resource dynamically ranks the order of retrieving the multiple portions of individually retrievable content based on the input from the user. For example, the display management resource dynamically ranks the order of retrieving the multiple portions of individually retrievable content based on the input from the user.

In accordance with further embodiments, the content is a webpage. The display management resource is operable to populate the rendition of the requested content based on which less-than-all portion of the rendered content has been selected for viewing on the display screen by the user.

Note further that the input can include any suitable information. In one embodiment, the input indicates a location of a cursor on the display screen. The user controls the location of the cursor via a tool such as a mouse. The display management resource utilizes the received input to control an order of retrieving the multiple portions. For example, in one embodiment, the display management resource first identifies a set of one or more portions of individually retrievable content in a vicinity (such as near or within a threshold value distance) of the location of the cursor.

During rendering, the display management resource then adjusts the retrieval and rendering order to retrieve the identified set of multiple portions of individually retrievable content (in the vicinity of the location) before retrieving other portions of the individually retrievable content that are further away from the cursor.

In one embodiment, directional movement and/or a location of the cursor indicates which portions of the webpage to retrieve and populate first. For example, it may be known based on a direction of the cursor what display elements to be populated in a webpage are of most interest. In certain instances, the webpage can be populated with preliminary display elements indicating what is to be populated in a particular region of the webpage. Via the preliminary display elements, the user moves the cursor in the direction of the displayed item of interest. In response to detecting that the user moves the cursor in a direction to a particular not-yet-rendered display element, the display management resource initiates retrieval and population of that not-yet-rendered display element as highest priority over rendering other display elements.

Alternatively, in a similar manner as previously discussed, the input from the user can be a window of viewing controlled by the user viewing the computer device and corresponding display screen. The display management resource utilizes the input to control the order of retrieving the multiple portions of individually retrievable content. For example, in one embodiment, the display management resource first identifies portions of the individually retrievable content residing in the window of viewing, and the adjusts, during rendering, the order of retrieving the identified portions of the individually retrievable content needed to populate the window of viewing prior to retrieving individually retrievable content needed to populate one or more regions of the rendered content outside the window of viewing.

Embodiments herein are useful over conventional techniques. For example, prioritizing population of portions of a webpage that are to be populated with content provides a better user experience than conventional techniques because content of higher interest is more quickly displayed for viewing by the user.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate display of content on a display screen. The instructions, when executed by computer processor hardware, cause the computer processor hardware (such as one or more co-located or disparately processor devices or hardware) to: communicate a request for retrieval of content to a server resource; in response to communicating the request, receive content display information defining how to produce a rendition of the requested content for display on a display screen, the display information indicating multiple portions of individually retrievable content in which to populate the rendition of the requested content; and utilize priority information to select an order of retrieving the multiple portions to populate the rendition of the requested content.

Another embodiment includes a computer readable storage medium and/or system having instructions stored thereon to facilitate display of content. The instructions, when executed by computer processor hardware, cause the computer processor hardware (such as one or more co-located or disparately processor devices or hardware) to: receive content display information indicating multiple portions of individually retrievable content in which to populate a rendition of requested content on a display screen; receive input from a user viewing the display screen; utilize the input to control an order of retrieving the multiple portions of individually retrievable content to populate the rendition of the requested content; and dynamically rank the order of retrieving the multiple portions of individually retrievable content based on the input.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 7 is an example diagram illustrating display information specifying how to render requested content according to embodiments herein.

Figure 1:
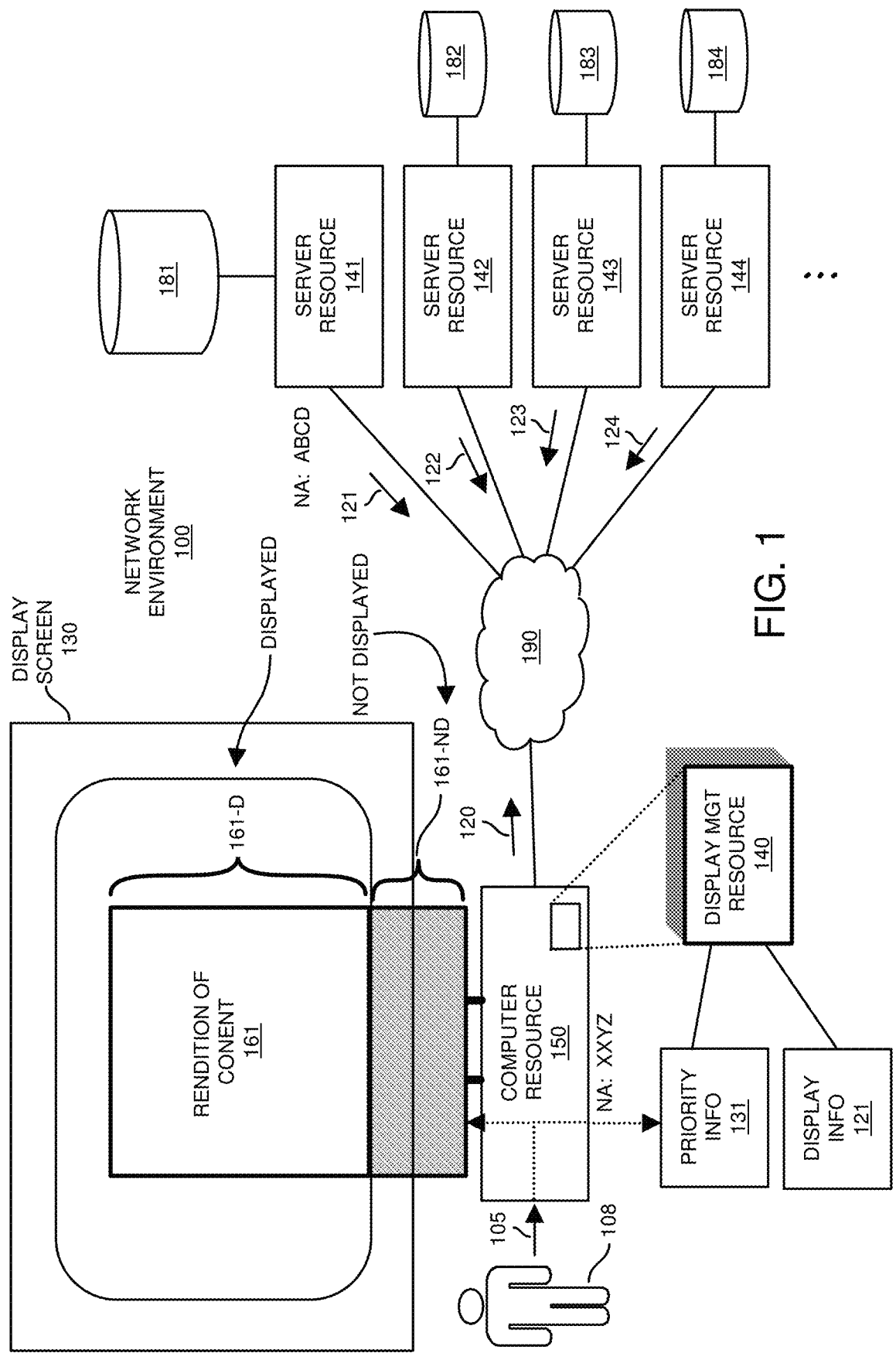
FIG. 1 is an example diagram illustrating a network environment supporting distribution and display of content according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a user operating a computer device communicates a request for retrieval of content to a server resource. In response to communicating the request, the communication device receives content display information (such as an HTML file, webpage information, etc.) from the server resource defining how to produce a rendition of the requested content for display on a display screen of the computer device. In one embodiment, the display information indicates multiple portions of individually retrievable content in which to populate the rendition of the requested content. During rendering of the requested content, the computer device utilizes priority information to select an order of retrieving the multiple portions to populate the rendition of the requested content.

Embodiments herein are useful over conventional techniques. For example, according to one embodiment, prioritizing population of portions of rendered content such as a webpage provides a better user experience than conventional techniques because content of higher interest is more quickly displayed for viewing by the user on the webpage being rendered.

Now, more specifically, FIG. 1 is an example diagram illustrating a computer supporting retrieval and display of requested content according to embodiments herein.

As shown, network environment 100 includes computer resource 150 (such as computer hardware, one or more devices, executed software, etc.) and corresponding display screen 130.

Computer resource 150 executes display management resource 140 (such as computer hardware and/or software) to display content on display screen 130.

In one embodiment, the display management resource 140 communicates over network 190 (such as the Internet or other suitable data transport mechanism) to retrieve content from one or more server resources such as server resource 141, server resource 142, server resource 143, server resource 144, etc.

As its name suggests, the display management resource 140 controls rendering of content 161 for display on display screen 130 based on content received from one or more server resources.

More specifically, in this example embodiment, assume that the display management resource 140 of the computer resource 150 receives input 105 from the user 108. In one embodiment, the input 105 is a command such as a request to retrieve content such as a webpage or other suitable content from the server resource 141.

In response to receiving the input 105, the display management resource 140 of the control resource 150 communicates a request 120 over network 190 to the server resource 141 for retrieval of content from server resource 141. In response to receiving the request 120, the server resource 141 communicates a message including content display information 121 over network 190 to the display management resource 140. Accordingly, the display management resource 140 receives content display information 121 defining how to produce a rendition of the requested content for display on the display screen 130. In one embodiment, the content display information 121 is an HTML file or other suitable information defining attributes of a respective webpage.

Note that the rendition of content 161 may be of any size and may fit entirely on the display screen 130 for viewing. Alternatively, such as in this example embodiment, the rendition of content 161 does not fit on display screen 130 for viewing at the same time. For example, as shown in FIG. 1, a first portion of the rendition of content 161-D is displayed on the display screen 130 while a second portion of the rendition of content 161-ND is not displayed on the display screen 130.

Note that to view different portions of the rendition of content 161, the user 108 supplies further input 105 (such as one or more commands) to the display management resource 140. The input 105 selects which portion of the rendition of content 161 is to be displayed on the display screen 130. In one embodiment, the user 108 operates a respective mouse to scroll rendition of content 161 up or down on the display screen 130.

As further discussed below, embodiments herein include using priority information 131 as a basis to control generation of the rendition of content 161.

Figure 2:
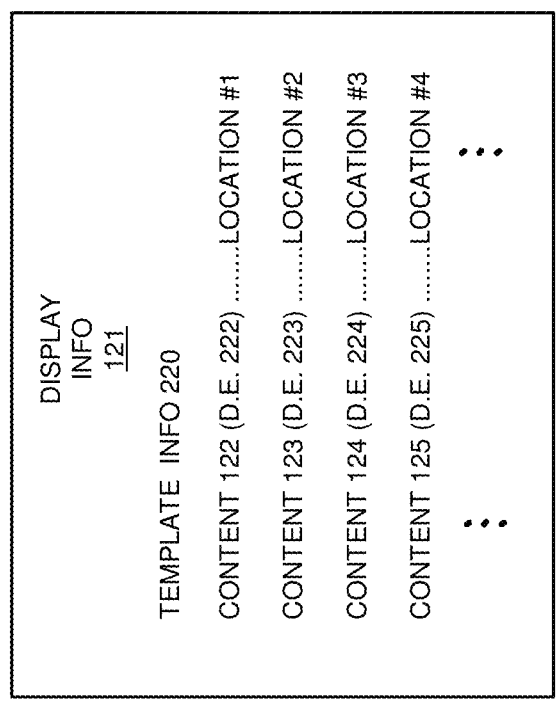
FIG. 2 is an example diagram illustrating display information specifying how to render content according to embodiments herein.

FIG. 2 is an example diagram illustrating display information specifying how to render content according to embodiments herein.

As previously discussed, the display management resource 140 receives display information 121. In one embodiment, as shown in FIG. 2, the display information 121 includes information such as template information 220 specifying how to generate a template (such as a pre-layout content structure) associated with the rendition of requested content 161.

As further shown, in addition to including template information 220 indicating a framework in which to generate rendition of requested content 161, the display information 121 further indicates multiple portions of individually retrievable content 122, 123, 124, 125, etc., in which to populate the template (framework) with corresponding display elements.

In this example embodiment, the content 122 is used to generate display element 222 in rendition of content 161; the content 123 is used to generate display element 223 in rendition of content 161; the content 124 is used to generate display element 224 in rendition of content 161; the content 125 is used to generate display element 225 in rendition of content 161; and so on.

Referring again to FIG. 1, as previously discussed, in contrast to conventional techniques of rendering content, the display management resource 140 as described herein uses priority information 131 to select a desired order of retrieving the multiple portions (individually retrievable content) to populate the rendition of the requested content 161. For example, as further discussed herein, the display management resource 140 retrieves the individually retrievable content 122, 123, 124, 125, etc., in accordance with the priority information 131.

Figure 3:
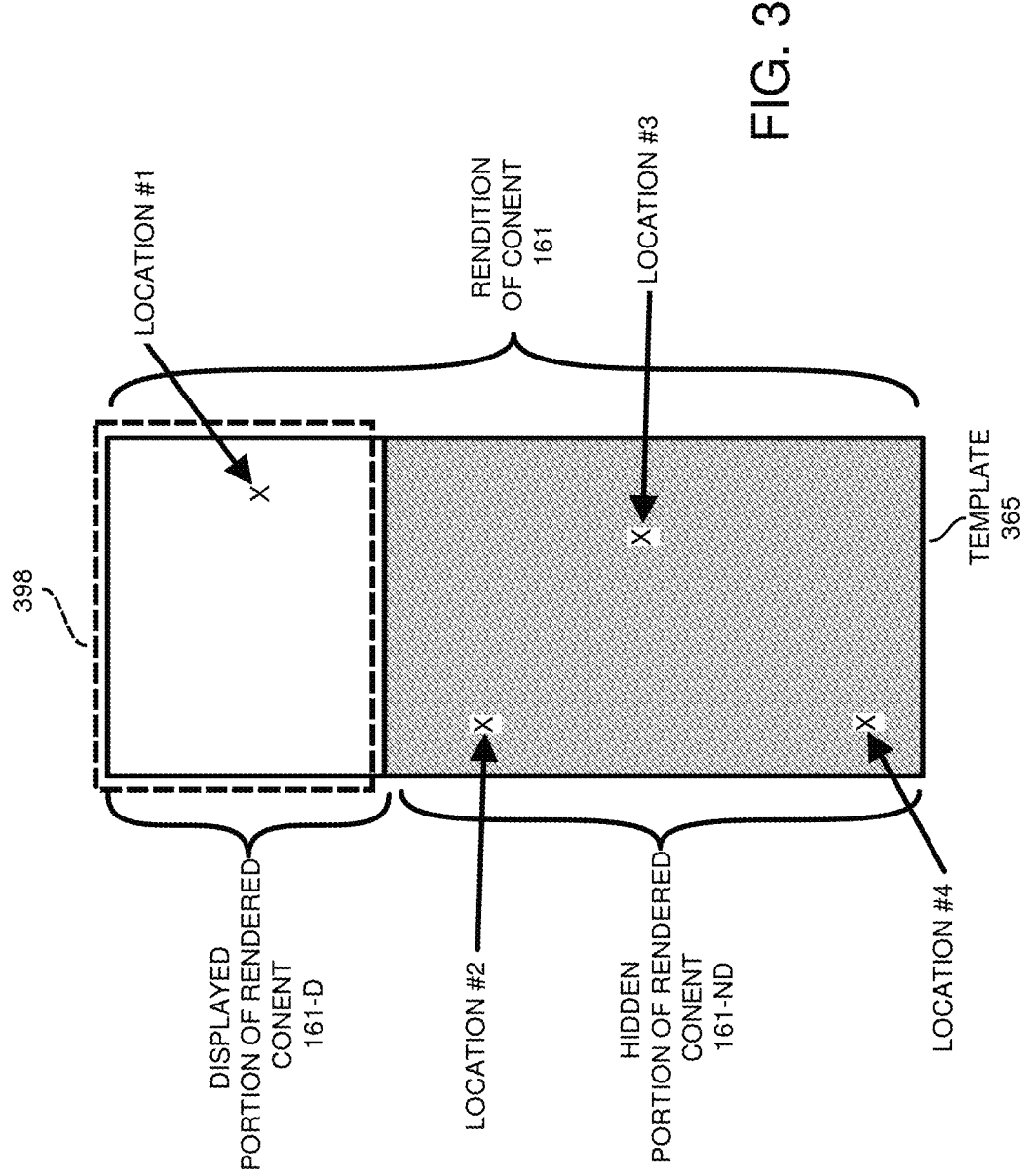
FIG. 3 is an example diagram illustrating a template in which to render content according to embodiments herein.

FIG. 3 is an example diagram illustrating a rendition of content according to embodiments herein.

As previously discussed, the display management resource 140 receives template information 220 defining a respective template (such as a framework, pre-layout content structure, etc.) to be used to generate the rendition of content 161. In such an instance, as shown in FIG. 3, using template information 220 received from server resource 141, the display management resource 140 produces a template 365 (pre-layout content structure).

As further shown, the template information 220 specifies locations in which each of the individually retrievable content is to be rendered.

In this example embodiment, assume that the display information 121 indicates that content 122 is to be used to produce corresponding display element 222 at location #1 in template 365; display information 121 indicates that content 123 is to be used to produce corresponding display element 223 at location #2 in template 365; display information 121 indicates that content 124 is to be used to produce corresponding display element 224 at location #3 in template 365; display information 121 indicates that content 125 is to be used to produce corresponding display element 225 at location #4 in template 365; and so on.

Note that each of the display elements can include any suitable information for rendering content such as static images, video, etc. In certain instances, rendering of content may include playback of audio to the user as well as displaying static or dynamic images.

Subsequent to creating the template 365, in accordance with further embodiments, the display management resource 140 uses the priority information 131 to identify an order of populating the template 365 with the multiple portions of individually retrievable content 122, 123, 124, 125, etc., to produce the rendition of the requested content 161.

In accordance with further embodiments as discussed below, the display management resource 140 can be configured to dynamically update the priority information 131 used to populate the rendition of requested content 161 based on which less-than-all portion of the rendered content has been selected for viewing on the display screen 130 by the user 108.

For example, the display management resource 140 can be configured to monitor a window region currently selected for viewing by the user 108. The display management resource 140 or other suitable resource updates the priority information 131 based on the input 105 from user 108 indicating selection of a window 398 of the rendered content 161 to be displayed on the display screen 130.

In one embodiment, the display management resource 140 produces the priority information 131 to indicate the order of retrieving the multiple portions of individually retrievable content 122, 123, 124, 125, etc., based on a location of the window 398 of the rendered content selected by the user 108. For example, in one embodiment, the display management resource 140 uses the location of the window 398 to identify a set of one or more individually retrievable portions of content to be displayed in the window. The display management resource 140 then retrieves the identified set of individually retrievable portions of the content to populate the window 398 on the display screen 130.

Note that in addition to or as an alternative to controlling an order of retrieving individually retrievable content and displaying renditions of same for viewing, further embodiments herein can include producing or modifying the priority information 131 to rank the multiple portions of individually retrievable content 122, 123, 124, etc., based at least in part on a quantity of data to be retrieved to render a respective portion of individually retrievable content associated with the requested webpage.

As a more specific example, if it is known (such as from the display information 121) that certain portions of individually retrievable content needed to populate the rendition of content 161 (such as individually retrievable content 123 and 124) are large files of video data and require high bandwidth to transmit over network 190 because they contain a large amount of data, such individually retrievable content can be ranked lower in priority information 131 for retrieval after content 122 and 125 have been retrieved and rendered in the template 365.

In accordance with yet further embodiments, note that the priority information 131 and generation of same can be user-configurable. For example, a user 108 can indicate types of content (such as video data) that are of highest interest (and that are to be retrieved and displayed first in the rendition of content 161) as well as types of content to de-prioritize. The content of lower interest is retrieved and/or rendered last after retrieval and rendition of the display elements of higher interest.

Figure 4:
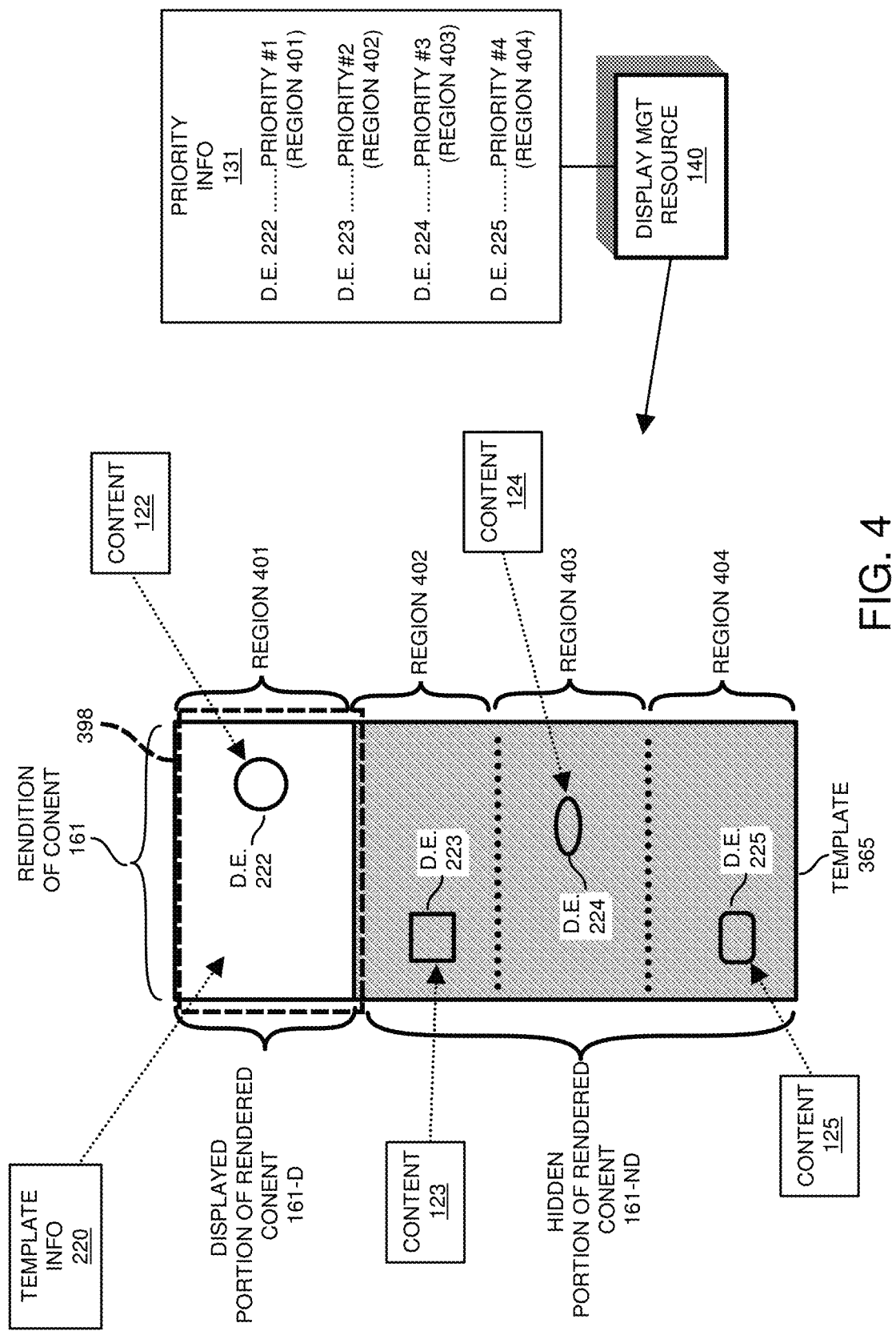
FIG. 4 is an example diagram illustrating population of display elements in a template at specified locations according to embodiments herein.

FIG. 4 is an example diagram illustrating a template in which to populate display elements at specified locations according to embodiments herein.

As shown in this example embodiment, the display management resource 140 populates the rendition of the requested content 161 (such as a webpage) and displays an appropriate portion of the webpage based on which less-than-all portion (such as window 398) of the content being rendered has been selected (such as by scrolling) for viewing on the display screen by the user 108. In this example embodiment, the display screen displays content 161-D on the display screen 130.

The display management resource 140 identifies that window 398 includes display element. In such an instance, the display management resource 140 or other suitable resource produces the priority information 131 to indicate that elements (or objects) such as display element 222 to be rendered in the region 401 is of highest priority for retrieval. This prompts the display management resource 140 to generate a request for individually retrievable content 122 prior to generating a request to retrieve content 123, 124, 125, etc.

In accordance with further embodiments, because region 402 is likely to be next viewed by the user 108, as indicated by the priority information 131, the display management resource 140 prioritizes retrieval and processing of content 123 over other content such that display element 223 is rendered prior to display elements 223, 224, 225, etc.

As indicated by the priority information 131, the display management resource 140 prioritizes processing of content 124 over other content such that display element 224 is rendered prior to display elements 225, etc.

Figure 5:
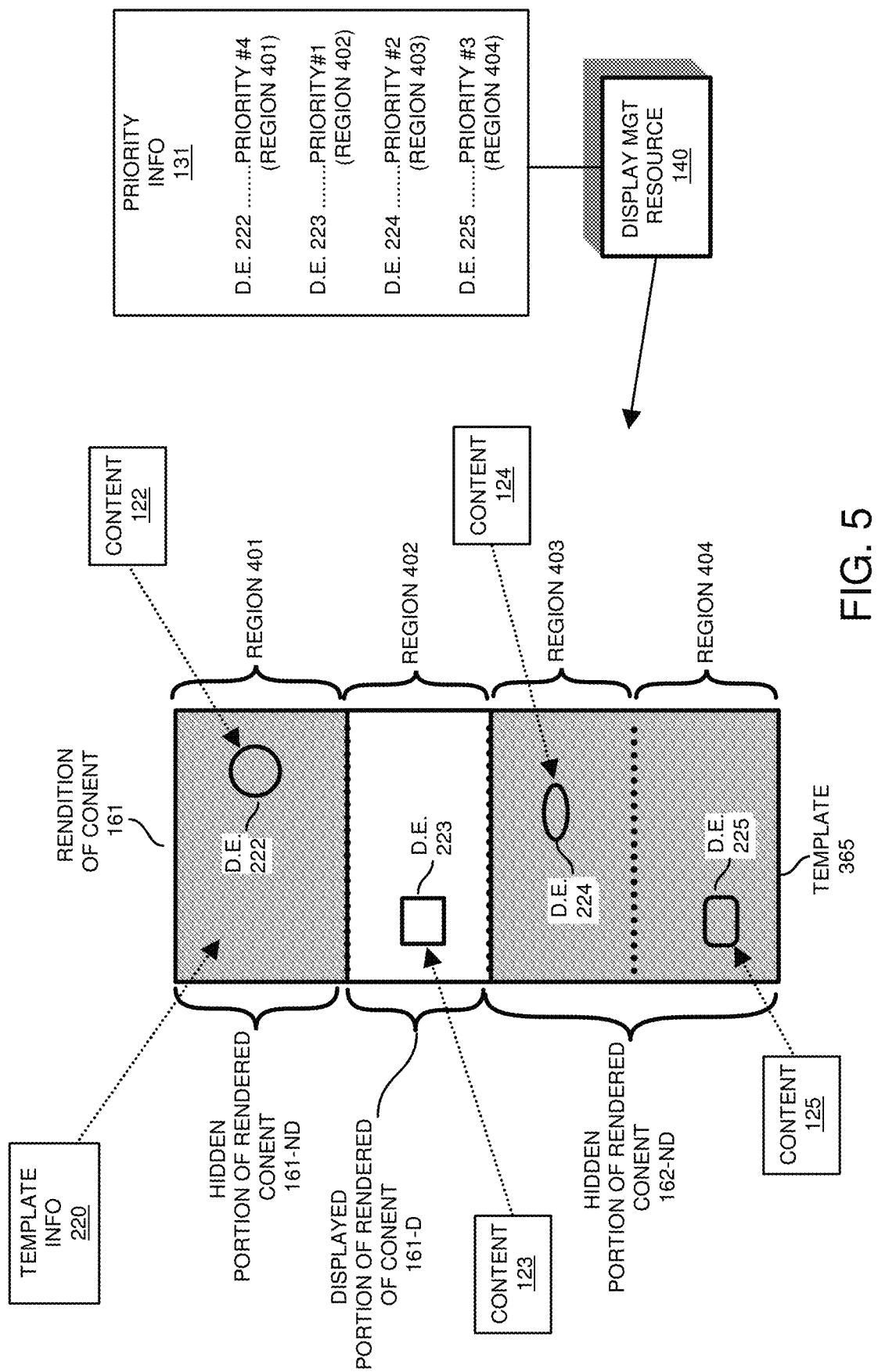
FIG. 5 is an example diagram illustrating dynamically prioritizing retrieval and display of content in a viewing region on a display screen according to embodiments herein.

FIG. 5 is an example diagram illustrating dynamically prioritizing retrieval and display of content on a display screen according to embodiments herein.

As shown in FIG. 5, a user 108 moves window 398 of viewing to a different portion of the webpage such as region 402. Note that the user 108 may move the viewing window (via input 105) prior to the entire template 365 being populated with respective display elements. In other words, the user 108 moves the window 398 while rendering the content 161.

In response to detecting the newly selected region 402, during a process of rendering content, the display management resource 140 (or other suitable resource) updates the priority information 131 to change a priority of retrieving the multiple portions of individually retrievable content based on new selection of region 402 (less than all portion) for viewing on the display screen 130.

In this example embodiment, because window 398 selects region 402 for viewing, the updated priority information 131 indicates to retrieve content 123 to populate the currently selected region 402 with the display element 223 prior to populating other regions of the rendition of content with display elements 222, 224, or 225. to this end, the priority information 131 indicates that the content 123 is ranked higher in priority for retrieval and rendering than each of content 124, 125, and 122 currently not selected for viewing on the display screen 130.

Thus, the priority information 131 can be updated to indicate a change in priority of retrieving individually retrievable content based on user input such as moving window 398 to select a new region.

As further indicated by the priority information 131 in FIG. 5, the display management resource 140 prioritizes retrieval and/or processing of content 124 over other content such that display element 224 is rendered prior to rendering of display elements 222, 225, etc.

Figure 6:
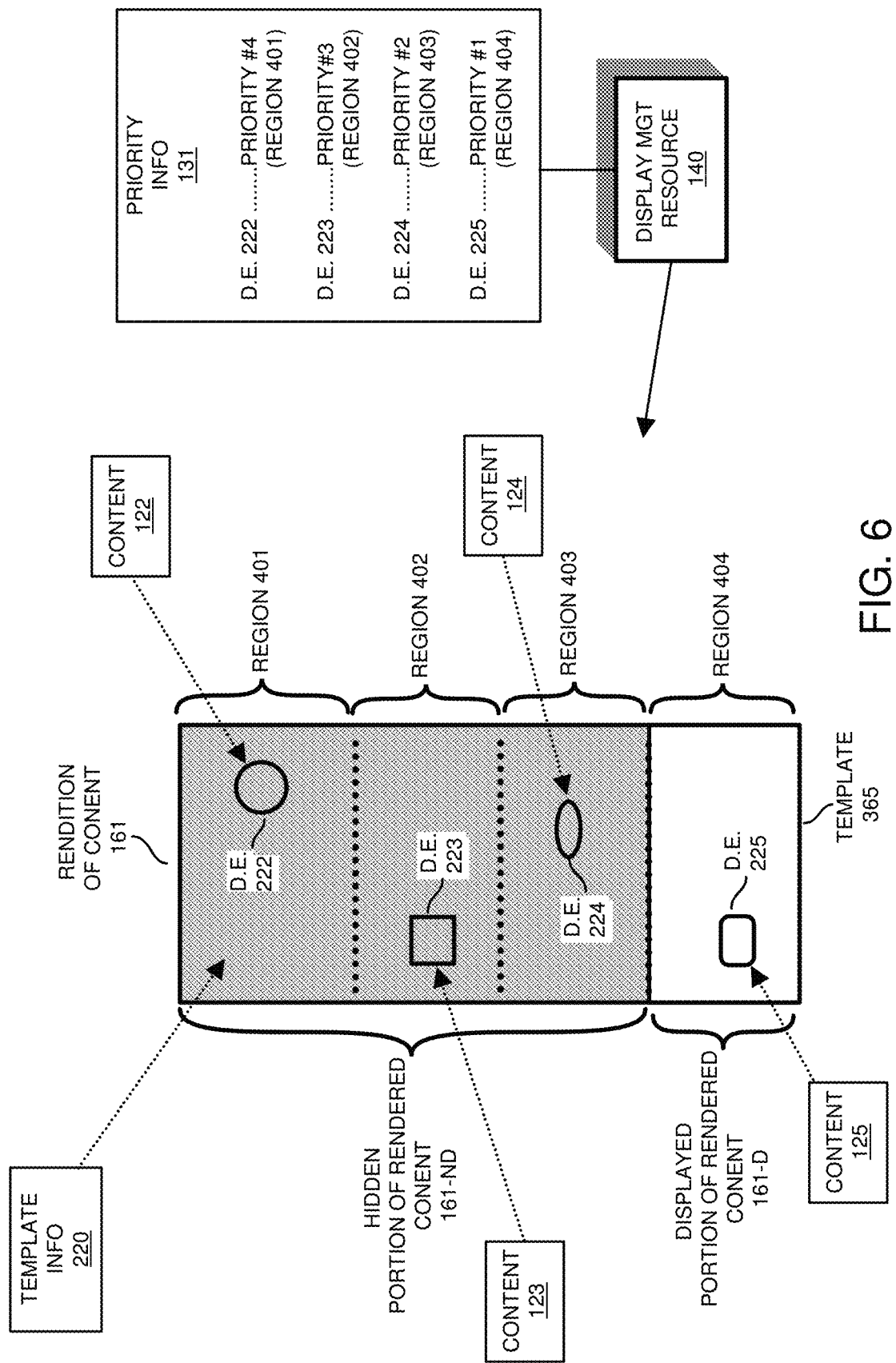
FIG. 6 is an example diagram illustrating dynamically prioritizing retrieval and display of content on a display screen according to embodiments herein.

FIG. 6 is an example diagram illustrating dynamically prioritizing retrieval and display of content on a display screen according to embodiments herein.

As shown in FIG. 6, the user 108 moves window of viewing to a different portion of the requested content such as region 404 prior to the entire template 365 being populated with respective display elements. In other words, prior to completing rendering of content, the user 108 scrolls down to view a different portion of the requested webpage (region 404).

In response to detecting the newly selected region 404, the display management resource 140 (or other suitable resource) updates the priority information 131 to change a priority of retrieving the multiple portions of individually retrievable content based on which less-than-all portion (such as region 404) of the rendition 161 that is newly selected by the user 108 for viewing on the display screen 130.

In this example embodiment, based on selection of region 404, the updated priority information 131 indicates to retrieve and render display element 225 (via first content 125) of the multiple individually retrievable content needed to populate the currently viewed less-than-all portion (region 404) of the rendition of requested content (region 402) on the display screen 130.

Thus, in a similar manner as previously discussed, the priority information 131 can be updated to indicate a change in priority of retrieving individually retrievable content based on user input 105 (such as movement of window 398).

As indicated by the updated priority information 131 in FIG. 6, the display management resource 140 prioritizes retrieval and/or processing of content 125 over other content such that display element 225 is rendered prior to rendering of display elements 222, 223, and 224.

As further indicated by the priority information 131, the display management resource 140 prioritizes processing and rendering of content 124 over rendering of other content such that display element 224 is rendered prior to rendering of display elements 222 and 223.

FIG. 7 is an example diagram illustrating display information specifying how to render content according to embodiments herein.

In this example embodiment, in a similar manner as previously discussed, the user 108 provides input 105 to control display of content on the display screen 130.

For example, referring again to FIG. 1, the display management resource 140 of the computer resource 150 receives input 105 from the user 108. The input 105 is a command such as a request to retrieve content such as a webpage or other suitable content from the server resource 141.

In response to receiving the input 105, the display management resource 140 of the control resource 150 communicates a request 120 for retrieval of content over network 190 to the server resource 141.

In response to receiving the request 120, the server resource 141 communicates a message including content display information 721 over network 190 to the display management resource 140. Accordingly, the display management resource 140 receives content display information 721 defining how to produce a rendition of the requested content for display on the display screen 130.

Referring again to FIG. 7, in one embodiment, the display information 721 includes template information 720 indicating a respective template (such as webpage or document framework) in which to populate multiple portions of individually retrievable content 122, 123, 124, 125, etc.

In a similar manner as previously discussed, display management resource 140 uses template information 720 in display information 721 to create a respective template (webpage framework). The display management resource 140 then retrieves the individually retrievable content 122, 123, 124, 125, etc., to populate the template with corresponding display elements 222, 223, 224, 225, etc.

As further discussed below, the display management resource 140 utilizes the input 105 from the user 108 to control an order of retrieving the multiple portions of individually retrievable content 122, 123, 124, etc., to populate the rendition of the requested content. For example, as further discussed below, input 105 from the user 108 such as movement of a respective cursor on display screen 130 is used as a basis to prioritize populating the template with respective retrievable content.

Figure 8:
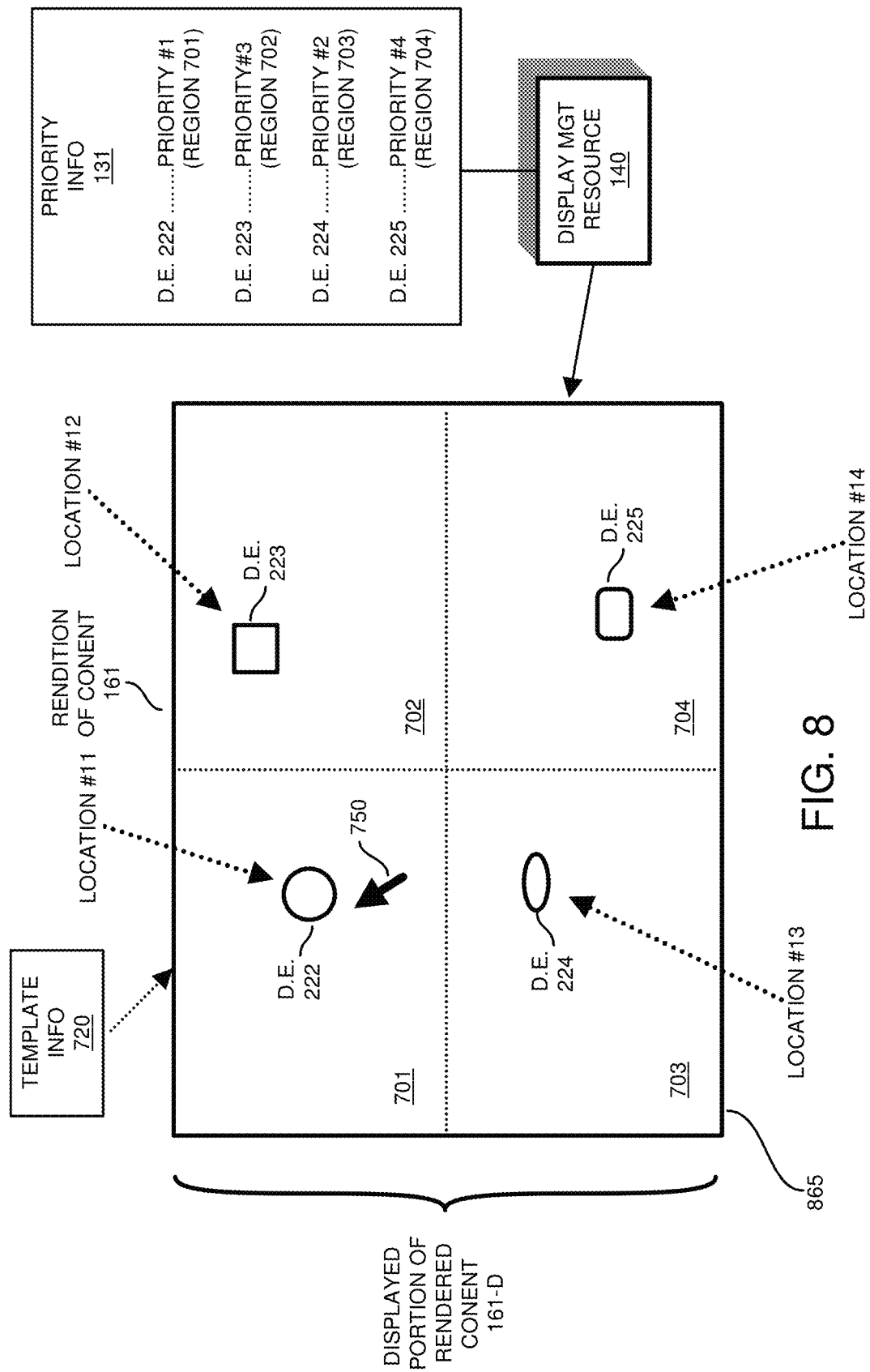
FIG. 8 is an example diagram illustrating a template in which to populate display elements at specified locations based on priority information according to embodiments herein according to embodiments herein.

FIG. 8 is an example diagram illustrating a template in which to populate display elements at specified locations based on priority information according to embodiments herein according to embodiments herein.

In accordance with further embodiments, the input 105 from the user 108 is movement of a cursor 750 controlled by the user 108 viewing the display screen 130. The display management resource 140 utilizes the input 105 (such as movement of the cursor 750) to control the order of retrieving the multiple portions of individually retrievable content 122, 123, 124, and 125.

More specifically, in one embodiment, the display management resource 140 first monitors a nearness of the location of the cursor 750 to respective display elements (to be rendered) or presence of the cursor in a particular region of multiple regions 701, 702, 703, and 704.

Based on detecting that the cursor 750 is located in region 701, or that cursor 750 is nearest to a location #11 where display element 222 is to be populated, the display management resource 140 produces priority information 131 to indicate that retrieval of content 122 to populate region 701 is of highest priority because that is the region of interest to the user 108. In such an instance, display management resource 140 adjusts the order of retrieving different portions of content as specified by the priority information 131 to first retrieve the content 122 for rendering display element 222.

Because the cursor 750 is further away from regions 702, 703, and 704, population of those regions are set to lower priority for retrieval of content to populate respective display elements 223, 224, and 225.

As previously discussed, retrieval of content and population of display elements can be prioritized based on distance between the cursor 750 and corresponding location where a display element is to be populated.

For example, the display management resource 140 can be configured to detect that the cursor 750 is 1 unit (of distance) away from the location #11 where display element 222 is to be populated; the display management resource 140 may detect that the cursor 750 is 3 units (of distance) away from the location #13 where display element 224 is to be populated; the display management resource 140 may detect that the cursor is 6 units (of distance) away from the location #12 where display element 223 is to be populated; the display management resource 140 may detect that the cursor is 9 units (of distance) away from the location #14 where display element 225 is to be populated.

In such an instance, based on these detected distances, the display management resource 140 (or other suitable resource) ranks the nearest display element 222 as being highest priority because it is nearest to cursor 750; the display management resource 140 (or other suitable resource) ranks the next display element 224 as being second in priority because it is next nearest to cursor 750; the display management resource 140 (or other suitable resource) ranks the next display element 223 as being third in priority because it is next nearest to cursor 750; and so on.

Accordingly, the display management resource 140 can be configured to populate respective content based on input form the respective user 108.

In accordance with further embodiments, note that directional movement and/or a location of the cursor indicates which portions of the webpage to retrieve and populate first. For example, it may be known based on a directional movement of the cursor 750 what display elements to be populated in a webpage are of most interest to a user 108. In certain instances, the requested webpage can be populated with preliminary display elements or information indicating what is to be populated in a particular region of the webpage. The user 108 is then notified where to move the cursor 750 to cause those regions of interest to be populated with respective display elements prior to rendering other display elements of lower interest on the display screen 130.

In certain instances, the webpage can be populated with preliminary display elements indicating what is to be populated in a particular region of the webpage. Via the preliminary display elements, the user moves the cursor in the direction of the displayed item of interest. In response to detecting that the user moves the cursor in a direction to a particular not-yet-fully rendered display element as indicated by the preliminary display element, the display management resource initiates retrieval and population of that not-yet-rendered display element as highest priority over rendering other not yet full rendered display elements.

Figure 9:
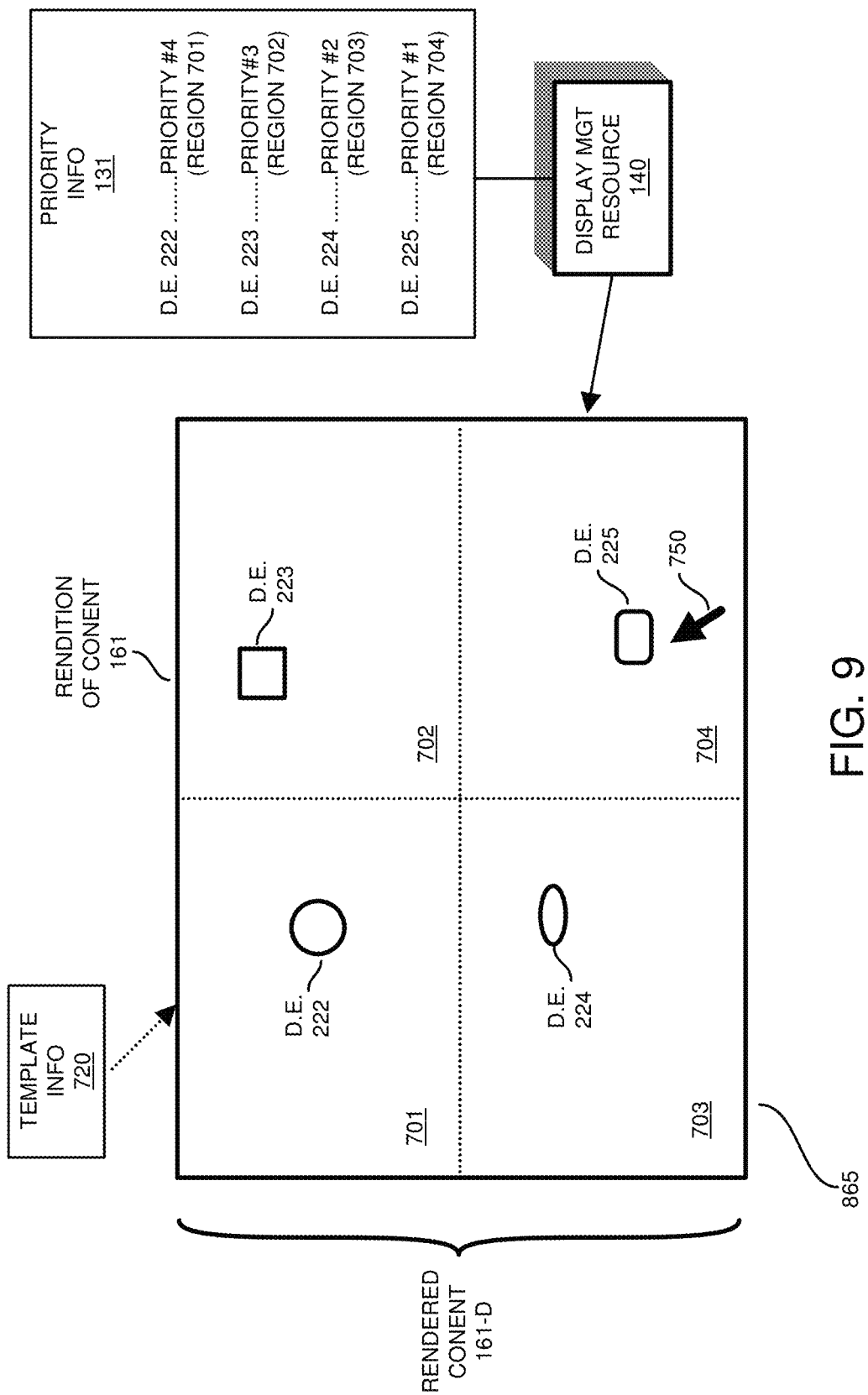
FIG. 9 is an example diagram illustrating re-prioritizing population of display elements at specified locations in a template using priority information according to embodiments herein according to embodiments herein.

FIG. 9 is an example diagram illustrating a template in which to populate display elements at specified locations in a template using priority information according to embodiments herein according to embodiments herein.

Assume that soon after requesting retrieval of content and receipt of display information 721, the input 105 from the user 108 indicates movement of cursor 750 to region 704 in a vicinity of the location where display element 225 is to be populated.

In one embodiment, the display management resource 140 detects presence of the cursor 750 in a particular region 704 of multiple regions 701, 702, 703, and 704.

Based on detecting that the cursor 750 is located in region 704 prior to populating the template 865 with individually retrievable content, or that cursor 750 is nearest to a location where display element 225 is to be populated, the display management resource 140 produces priority information 131 to indicate that retrieval of content 122 to populate region 704 is of highest priority because that is the region of interest to the user 108 as indicated by the location of the cursor 750. In such an instance, display management resource 140 adjusts the order of retrieving content as specified by the priority information 731 to retrieve the content 125 first to render display element 225 in region 704 as shown.

In one embodiment, because the cursor 750 is further away from regions 701, 702, and 703, population of those regions is given lower priority for retrieval of content to populate respective display elements 221, 222, and 223.

As previously discussed, as an alternative to detecting the cursor in a zone and populating that zone first, embodiments herein can include prioritizing population of display elements based on distance between the cursor 750 and corresponding locations where display elements are to be populated.

In this example embodiment, assume that the display management resource 140 detects that the cursor 750 is 1 unit (of distance) away from the location #14 where display element 225 is to be populated; the display management resource 140 detects that the cursor 750 is 10 units (of distance) away from the location #13 where display element 224 is to be populated; the display management resource 140 detects that the cursor 750 is 15 units (of distance) away from the location #12 where display element 223 is to be populated; the display management resource 140 detects that the cursor is 15 units (of distance) away from the location #11 where display element 222 is to be populated.

In such an instance, based on the distances, as indicated by priority information 131, the display management resource 140 (or other suitable resource) ranks the nearest display element 225 as being highest priority to populate because it is nearest to cursor 750; the display management resource 140 (or other suitable resource) ranks the next display element 224 as being second in priority because it is next nearest to cursor 750; the display management resource 140 (or other suitable resource) ranks the next display element 223 as being third in priority because it is next nearest to cursor 750; and so on.

Accordingly, the display management resource 140 can be configured to populate respective content based on input from the respective user 108.

Figure 10:
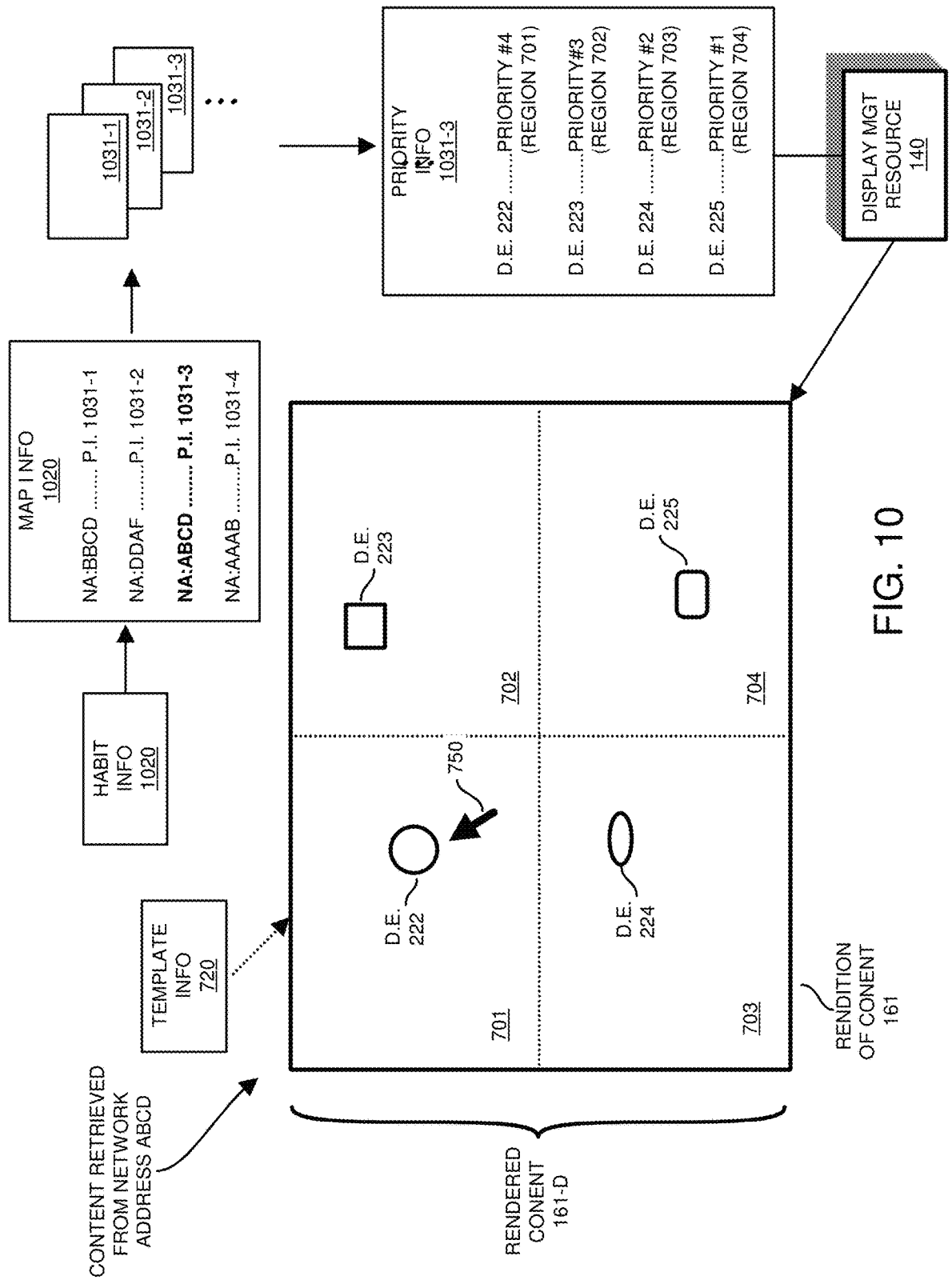
FIG. 10 is an example diagram illustrating population of display elements on a display screen based on prior habits of a user retrieving content according to embodiments herein.

FIG. 10 is an example diagram illustrating population of display elements on a display screen based on prior habits of one or more users according to embodiments herein according to embodiments herein.

Assume in this example embodiment that the user of the computer resource 140 repeatedly, on prior occasions, retrieves the same webpage of content for viewing on the display screen.

In one embodiment, for the displayed webpage on one or more prior occasions, the display management resource 140 or other suitable resource keeps track of movement of a cursor 750, scrolling of a display window, etc., to identify specific regions of interest to the user 108. The display management resource 140 can assume that repeated actions (on different days of the week) such as clicking on a particular display element, movement of a mouse to an area of displayed content, etc., in the previously displayed webpage indicates a region of interest to the user 108. In such an instance, the display management resource 140 produces habit information 1020 indicating specific regions of interest for each of multiple different webpages that are retrieved and viewed by the user 108.

In one embodiment, the display management resource 140 produces the priority information 1031 (such as priority information 1031-1, 1031-2, 1031-3, etc.) based on a prior history (such as prior occasions) of the user repeatedly viewing a same respective portion of a retrieved webpage. In other words, in this example embodiment, the request for retrieval of content may be a webpage identifier such as network address ABCD. The requested content may be a webpage. The display management resource 140 or other suitable resource produces the priority information 1031 based on prior habits of a user 108 (or multiple users) retrieving the webpage and viewing portions of the rendition of the content 162 on the display screen 130. The display management resource 140 tracks the regions of most interest on the repeatedly retrieved webpage.

Embodiments herein include producing map information 120 mapping a respective unique identifier value (such as a network address) of a retrievable webpage to a corresponding set of priority information to populate the respective webpage. For example, the webpage identifier (such as network address BBCD) maps to the priority information 1031-1 indicating portions of highest interest for that particular webpage; the webpage identifier (such as network address DDAF) maps to the priority information 1031-2 indicating portions of highest interest for that particular webpage; the webpage identifier (such as network IP address or device address ABCD) maps to the priority information 1031-3 indicating portions of highest interest for that particular webpage; and so on.

In this example embodiment, the user requests retrieval of the webpage at network address ABCD. In such an instance, the display management resource 140 uses the map 1020 to map the network address ABDC to priority information 1031-3. As indicated by map information 1020, the priority information 1031-3 indicates the region or regions of the webpage that are of greatest interest by one or more users for that retrieved webpage.

In one embodiment, the regions of a corresponding webpage are ranked as indicated by respective priority information 1031. For example, as indicated by priority information 1031-3, the display element 225 in region 704 is ranked highest for retrieval and display; the display element 224 in region 703 is ranked next highest for retrieval and display; the display element 223 in region 702 is ranked next highest for retrieval and display; the display element 222 in region 701 is ranked last for retrieval and display.

Accordingly, when the user 108 retrieves the webpage at network address ABCD again, the display management resource 140 is configured to retrieve the priority information 1031-3 to identify the one or more regions of the corresponding webpage most likely of interest and populates those regions first during the rendering of the requested webpage. More specifically, to accommodate the user 108, when producing a rendition of the webpage (such as rendition of content 162), the display management resource 140 gives highest priority to retrieving individually retrievable content 125 to immediately populate region 704 with display element 225. Thereafter, when producing the rendition of the webpage (such as rendition of content 162), the display management resource 140 gives next highest priority to retrieving individually retrievable content 124 to populate region 703 with display element 224, and so on.

Note that as an alternative to generating the priority information based on a single user, embodiments herein include monitoring (such as from one or more remote server resources serving the content or from each of the multiple user-operated computer resources) which of the multiple portions of individually retrievable content are of highest interest to multiple users retrieving the content. Thus, the priority information for a given webpage can indicate a ranking of the portions of greatest interest (such as most or more popular) amongst multiple users retrieving the respective webpage as opposed to only a single user.

Additional Embodiments

As previously discussed, embodiments herein include the process of loading content referenced in a downloaded file such as an HTML file, such as in a manner that optimizes user experience and minimizes the time it takes for the client to display objects of interest.

In accordance with further embodiments, upon receiving an HTML file for processing, the client identifies the target display size (width×height, referenced here as W×H in FIG. 11) that will be used for rendering content. Both the width (W) and height (H) of the display region in zone #1 (region 1110) are assessed at this stage.

Next, the client examines the received HTML content, including any sizing information for embedded and externally loadable content. With all the object placement required, and information about the W×H for the target display, the client (such as display management resource 140) builds the rendered web content 1110 and sizing of Wc×Hc, in such a way that Wc<=W, and Hc>=H.

In most cases, embedded display elements such as images, frames, videos, etc., have an explicitly defined size to better control the website layout. Based on this information, the client (display management resource 140) divides the loadable content into at least two groups: high priority objects (such as in zone #1) that are required for immediate display on a respective display screen 130 and low priority objects that can be downloaded in the background and displayed at a later time (such as indicated by zone #2, zone #3, zone #4 as shown in FIG. 11.

Figure 11:
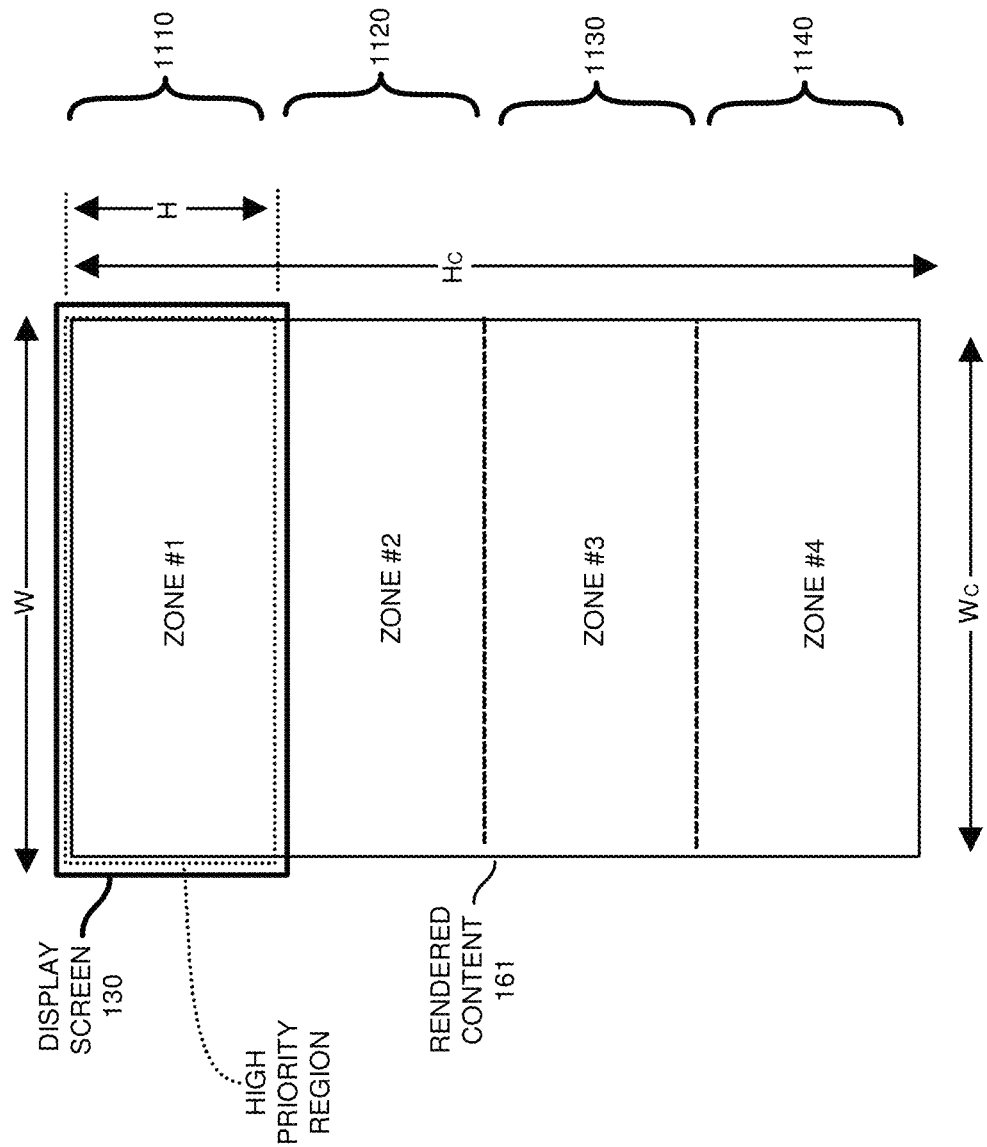
FIG. 11 is an example diagram illustrating rendering of content according to embodiments herein.

FIG. 11 is an example diagram illustrating zones, in which zone #1 (region 1110) is assigned the highest priority (high priority region 1440) and zone #4 (region 1140) is assigned a lowest priority. In one embodiment, the height of zone #1 is typically configured in such a way that the height H of zone #1<=Hc, to provide sufficient material below the edge of the display window to allow the user for limited immediate scrolling and content visibility.

The display management resource 140 proceeds with the download of all external content and rendering for zone #1 of content 1180. After zone #1 (region 1110) is completely rendered and displayed, the client moves to download and rendering of zone #2 (region 1120), and onwards, until the whole webpage or document is rendered and available for displaying respective portions. Zone #1 is given highest priority for populating respective display elements residing therein; zone #2 is given a next highest priority for populating respective display elements residing therein; etc.

Figure 12:
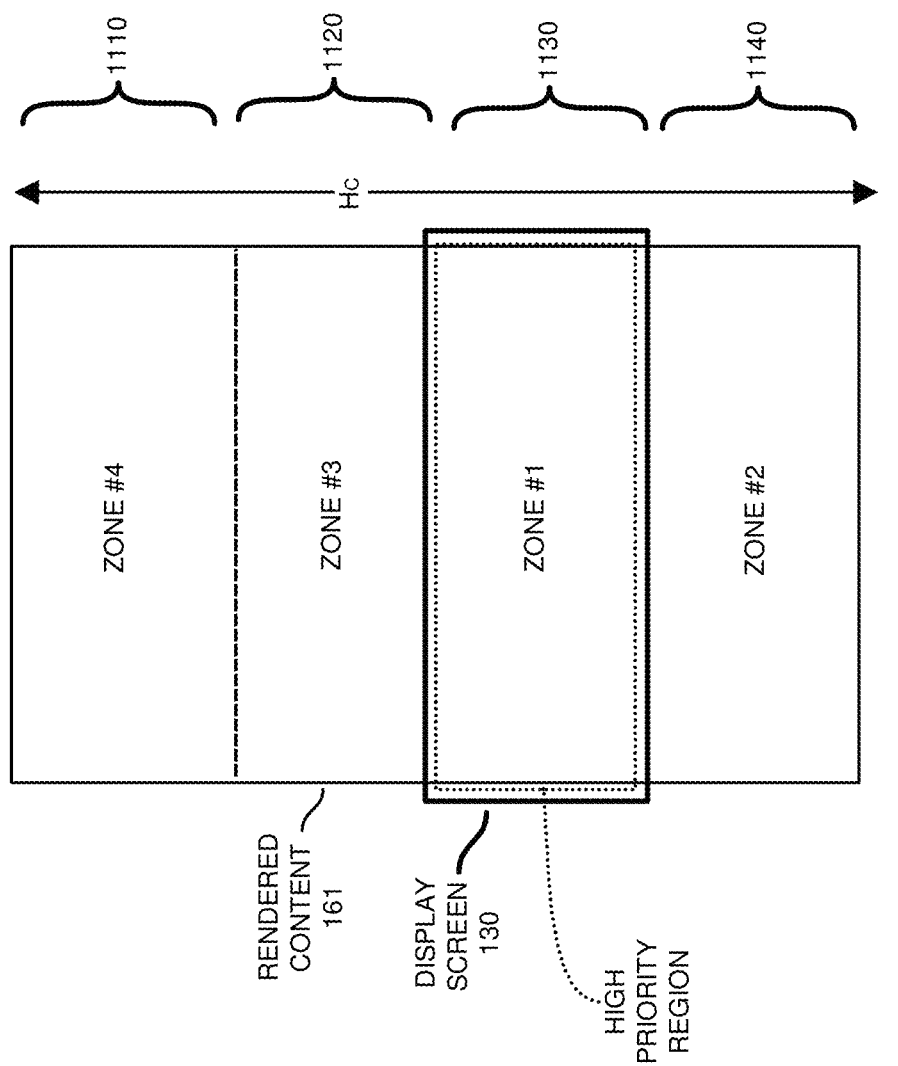
FIG. 12 is an example diagram illustrating prioritizing population of zones in rendered content according to embodiments herein.

Additionally, the client tracks the position of the web content relative to the individual zones. If the whole webpage/document is already loaded and rendered, there is no action needed, and the client only displays the already rendered content. If the webpage/document is still being loaded, any change in the position of the web content relative to the display causes reallocation of the priority zones, as shown in FIG. 12. In such an instance, as shown in FIG. 12, if not yet rendered, the client proceeds with loading and rendering external content (zone #1 or region 1130) following the priority of reallocated zones, as described before. The zone covering already loaded and rendered web content is assigned the lowest priority (it is likely all loaded and rendered by now anyway).

Note further that the download and rendering process can be further optimized towards the end-user experience where a more aggressive content time out mechanism is implemented, whereby any external content that is larger than a certain predefined (and user-configurable) threshold size of S (expressed in bytes, for example) is moved into a lower priority download queue to avoid holding up the rendering process. The client replaces the target content for such an object with a default image indicating content loading in the background. The threshold size S is user-configurable, with a default value configured in a client-specific manner such that most of the typical images and dynamic content is loaded with the priority of the given zone.

Furthermore, the client may allow configuring priority of specific content type, for example, lowering the priority for all Adobe Flash™ content and downloading it with a lower priority as described above. Types of de-prioritized content can be user-configurable, with a default value configured in a client-specific manner such that most of the typical images and dynamic content is loaded with the priority of the given zone, while the majority of larger (in terms of byte size) content is loaded as a background task.

Figure 13:
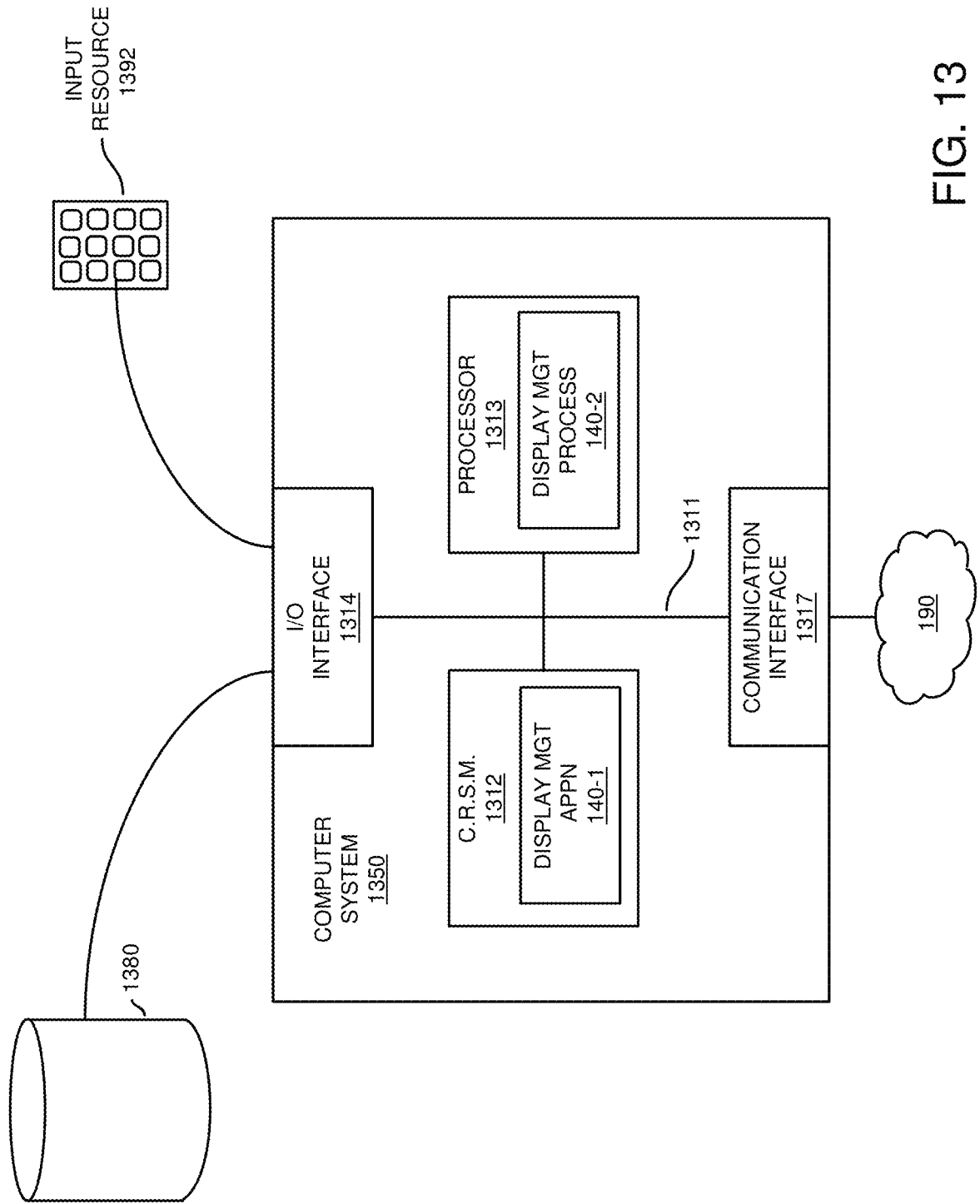
FIG. 13 is an example diagram illustrating example computer architecture operable to execute one or more operations according to embodiments herein.

FIG. 13 is an example block diagram of a computer system for implementing any of the operations as previously discussed according to embodiments herein.

Any of the resources (such as display management resource 140, server resources, computer resource 150, display screen 130, etc.) as discussed herein can be configured to include computer processor hardware and/or corresponding executable software instructions to carry out the different operations as discussed herein.

As shown, computer system 1350 of the present example includes an interconnect 1311 coupling computer readable storage media 1312 such as a non-transitory type of media (which can be any suitable type of hardware storage medium in which digital information can be stored and retrieved), a processor 1313 (computer processor hardware), I/O interface 1314, and a communications interface 1317.

I/O interface(s) 1314 supports connectivity to repository 1380 and input resource 1392.

Computer readable storage medium 1312 can be any hardware storage device such as memory, optical storage, hard drive, floppy disk, etc. In one embodiment, the computer readable storage medium 1312 stores instructions and/or data.

As shown, computer readable storage media 1312 can be encoded with communication management application 140-1 (e.g., including instructions) to carry out any of the operations as discussed herein.

During operation of one embodiment, processor 1313 accesses computer readable storage media 1312 via the use of interconnect 1311 in order to launch, run, execute, interpret or otherwise perform the instructions in communication with bank letters the check. For the bank account management application 140-1 stored on computer readable storage medium 1312. Execution of the communication management application 140-1 produces communication management process 140-2 to carry out any of the operations and/or processes as discussed herein.

Those skilled in the art will understand that the computer system 1350 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIG. 14. Note that the steps in the flowcharts below can be executed in any suitable order.

Figure 14:
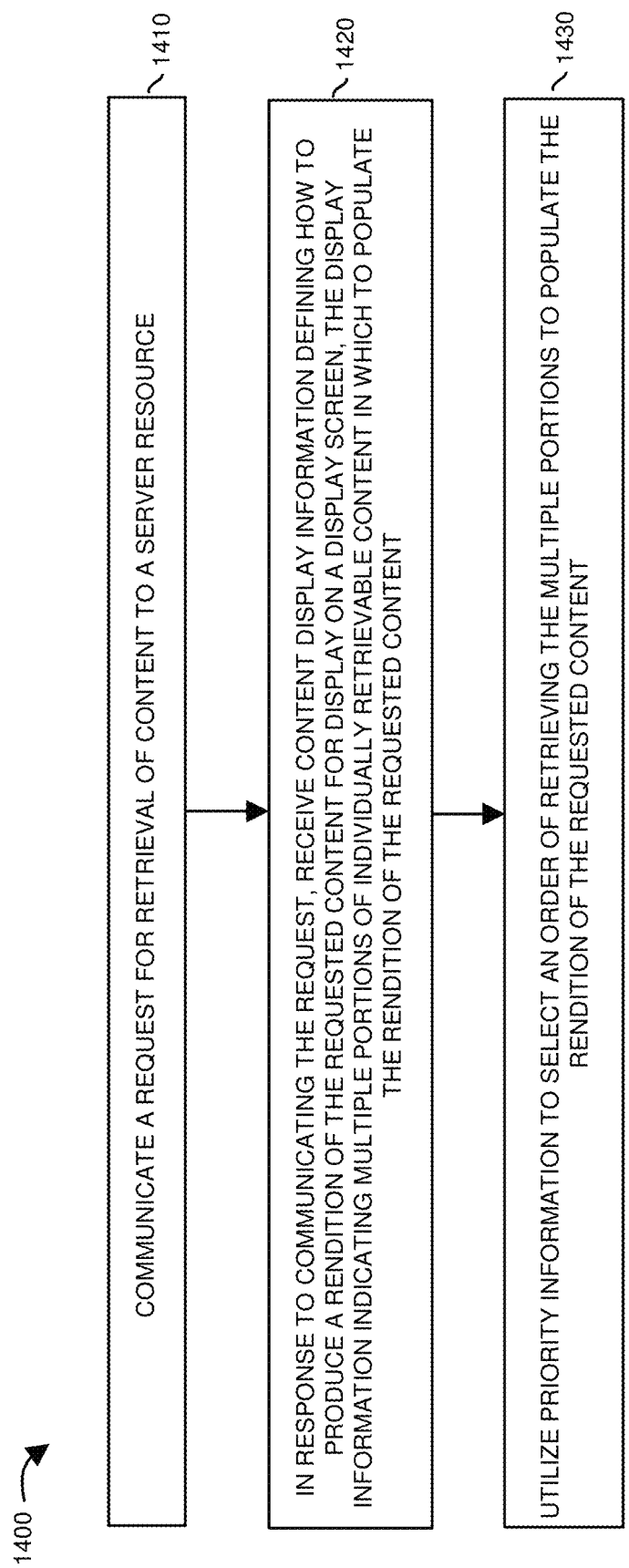
FIG. 14 is an example diagram illustrating a method according to embodiments herein.

FIG. 14 is a flowchart 1400 illustrating an example method according to embodiments. Note that there will be some overlap with respect to concepts as discussed above.

In processing operation 1410, the computer device communicates a request for retrieval of content to a server resource.

In processing operation 1420, in response to communicating the request, the computer device receives content display information defining how to produce a rendition of the requested content for display on a display screen 130. The content display information indicates multiple portions of individually retrievable content in which to populate the rendition of the requested content.

Figure 15:
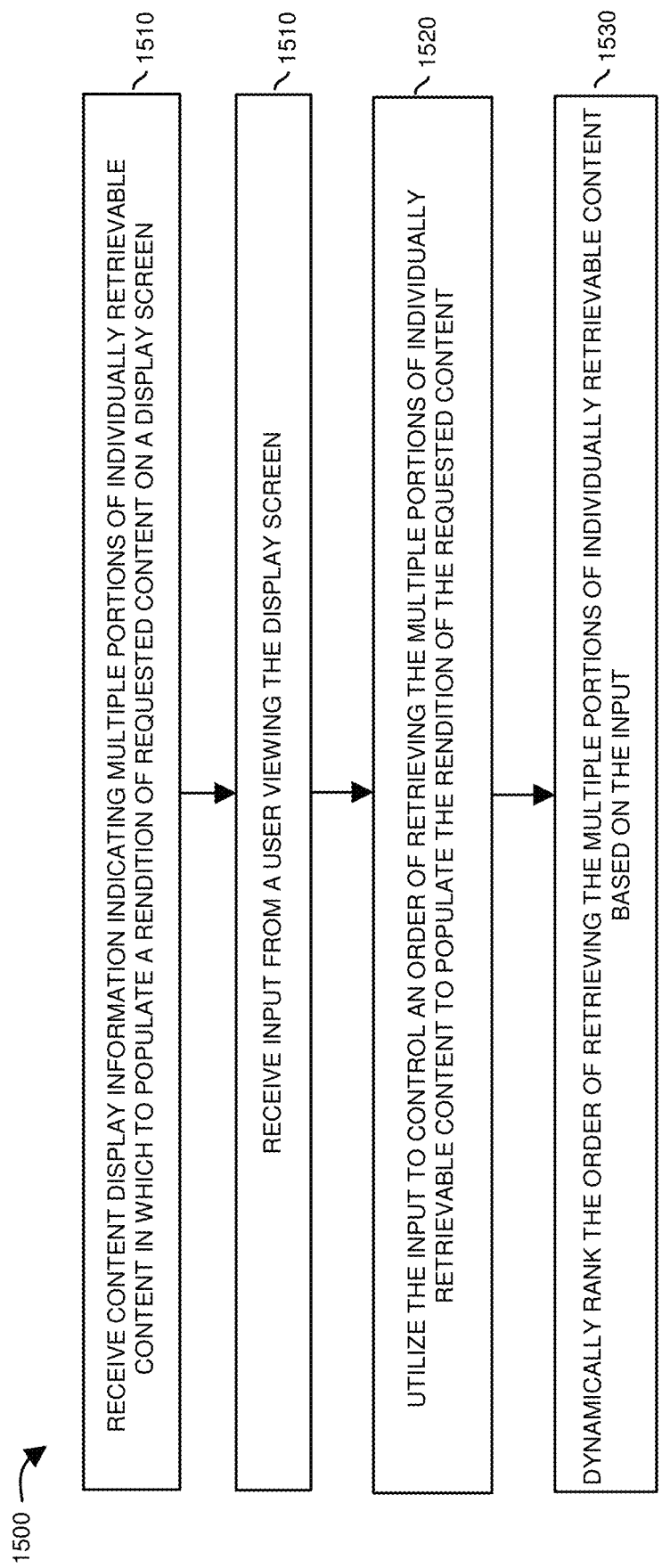
FIG. 15 is an example diagram illustrating a method according to embodiments herein.

In processing operation 1430, the computer device utilizes priority information to select an order of retrieving the multiple portions to populate the rendition of the requested content FIG. 15 is a flowchart 1500 illustrating an example method according to embodiments. Note that there will be some overlap with respect to concepts as discussed above.

In processing operation 1510, the computer device receives content display information indicating multiple portions of individually retrievable content in which to populate a rendition of requested content on a display screen.

In processing operation 1520, the computer device receives input from a user viewing the display screen.

In processing operation 1530, the computer device utilizes the input to control an order of retrieving the multiple portions of individually retrievable content to populate the rendition of the requested content.

In processing operation 1540, the computer device dynamically ranks the order of retrieving the multiple portions of individually retrievable content based on the input.

Note again that techniques herein are well suited to provide a better experience of displaying content on a display screen. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:

communicating a request for retrieval of content to a server resource, the request communicated from a computer device operated by a user;

in response to communicating the request, receiving content display information defining how to produce a rendition of the requested content for display on a display screen of the computer device, the content display information indicating multiple portions of individually retrievable content in which to populate the rendition of the requested content; and at the computer device, to satisfy the request for retrieval of content:
  utilizing priority information to select a sequential order of retrieving the multiple portions of individually retrievable content as specified by the content display information;
  as specified by the sequential order, retrieving the multiple portions of individually retrievable content; and
  via the retrieved multiple portions of individually retrievable content, populating the rendition of the requested content on the display screen.

2. The method as in claim 1 further comprising:
dynamically updating the priority information to populate the rendition of requested content based on which less-than-all portion of the content requested for retrieval has been selected for viewing on the display screen by the user.

3. The method as in claim 1, wherein the priority information indicates to retrieve first portions of the multiple portions of individually retrievable content needed to populate a currently viewed first less-than-all window of the requested content on the display screen, the priority information indicating that the first portions are ranked higher in priority than second portions of the multiple portions of individually retrievable content needed to populate a second less-than-all window of the requested content currently not selected for display on the display screen.

4. The method as in claim 1, wherein the rendition of the requested content is a webpage repeatedly retrieved and displayed by the user on the display screen on prior occasions of the user retrieving the content; and
  wherein the priority information is generated based on the prior occasions of the user repeatedly viewing a same respective portion of the retrieved webpage.

5. The method as in claim 1 further comprising:
producing a template as specified by the content display information; and
in accordance with the priority information, and sequential order, populating the template with the multiple portions of individually retrievable content to produce the rendition of the requested content.

6. The method as in claim 1, wherein the user viewing the display screen produces input selecting a window of the requested content to be displayed on the display screen, the method further comprising:
  producing the priority information indicating the sequential order of retrieving the multiple portions of individually retrievable content based on a location of the window of the content selected by the user.

7. The method as in claim 6 further comprising:
utilizing the location of the window to identify a set of individually retrievable portions of content to be displayed in the window on the display screen; and
retrieving the identified set of individually retrievable portions of the content to populate the display screen prior to populating portions of the content outside the window.

8. The method as in claim 1 further comprising:
detecting a newly selected less-than-all portion of the rendition for viewing on the display screen; and
updating the priority information to change a priority of retrieving the multiple portions of individually retrievable content based on which less-than-all portion of the rendition is newly selected by the user for viewing on the display screen.

9. The method as in claim 1, wherein the priority information ranks the multiple portions of individually retrievable content based at least in part on a quantity of data to be retrieved to render a respective portion of the multiple portions.

10. The method as in claim 1, wherein the priority information is user-configurable.

11. The method as in claim 1, wherein the priority information is generated based on monitoring which of the multiple portions of individually retrievable content are detected as being of highest interest to multiple different users retrieving the content, the priority information indicating to retrieve the portions of highest interest before retrieving portions of lower interest.

12. The method as in claim 1, wherein the request for retrieval of content is a webpage identifier;
  wherein the requested content is a webpage;
  the method further comprising:
  producing the priority information based on prior habits of the user retrieving the webpage and viewing portions of the rendition of the content on the display screen; and
  mapping the webpage identifier to the priority information.

13. The method as in claim 1 further comprising:
producing the priority information based on a location of a cursor displayed on the display screen, the location of the cursor controlled by the user viewing the display screen.

14. The method as in claim 13 further comprising:
based on the location of the cursor, identifying a portion of individually retrievable content to be displayed in a vicinity of the cursor; and
updating the priority information to increase a priority ranking of retrieving the identified portion of individually retrievable content.

15. The method as in claim 1, wherein the priority information is generated prior to communication of the request for retrieval of content to the server resource.

16. The method as in claim 1, wherein the priority information is updated in response to receiving window selection control input from the user, the window selection control input controlling display of a corresponding window of the rendition of the requested content on the display screen.

17. The method as in claim 1, wherein the priority information indicates a ranking of a first portion of the multiple portions of the requested content viewed by the user on a prior occasion of the user retrieving and displaying the rendition of the requested content on the display screen.

18. The method as in claim 1, wherein a first instance of the priority information indicates a first retrieval ranking of a first portion, a second portion, and a third portion of the multiple portions of the requested content, the method further comprising:
  in response to detecting selection of the third portion for viewing by the user on the display screen, producing a second instance of the priority information to indicate a second retrieval ranking of the first portion, the second portion, and the third portion of the multiple portions of the requested content, the second retrieval ranking different than the first retrieval ranking.

19. The method as in claim 1 further comprising:
updating the priority information to include a different ranking of the multiple portions based on the user scrolling through the rendition of the content on the display screen.

20. The method as in claim 19 further comprising:
producing the updated priority information to prioritize display of the portions of the requested content based on locations of the portions of the requested content relative to a selected window of the requested content.

21. The method as in claim 1 further comprising:
updating the priority information to include a different ranking of the multiple portions based on the user selecting a display element of the requested content on the display screen; and
producing the updated priority information to prioritize display of the portions of the requested content based on nearness of the portions of the requested content relative to the selected display element.

22. The method as in claim 1 further comprising:
via the priority information, ranking each of the multiple portions of individually retrievable content based on a nearness of the multiple portions to a cursor on the display screen, movement of the cursor controlled by the user.

23. The method as in claim 22, wherein the priority information ranks the sequential order of retrieving a set of the multiple portions that reside outside a currently selected window of viewing the requested content.

24. The method as in claim 1 further comprising:
mapping an identity of the requested content to the priority information.

25. The method as in claim 1, wherein the sequential order controls retrieval of a set of the multiple portions of the individually retrievable content located in a window of the rendition of the requested content not currently selected for viewing on the display screen.

26. A method comprising:
receiving content display information indicating multiple portions of individually retrievable content in which to populate a rendition of requested content on a display screen;
receiving input from a user viewing the display screen;
determining a sequential order based on the input;
utilizing the sequential order to control retrieving the multiple portions of individually retrievable content over time; and
populating the rendition of the requested content via the multiple retrieved portions.

27. The method as in claim 26, wherein the content is a webpage, the method further comprising:
populating the rendition of the requested content based on which less-than-all portion of the rendered content has been selected for viewing on the display screen by the user.

28. The method as in claim 26, wherein the input indicates a location of a cursor displayed on the display screen, the location of the cursor controlled by the user; and
wherein utilizing the input to control the sequential order of retrieving the multiple portions includes: i) identifying a set of multiple portions of individually retrievable content in a vicinity of the location of the cursor, and ii) adjusting the sequential order to retrieve the identified set of multiple portions of individually retrievable content before retrieving other portions of the individually retrievable content.

29. The method as in claim 26, wherein the input is a window of viewing controlled by the user viewing the display screen; and
wherein utilizing the input to control the sequential order of retrieving the multiple portions of individually retrievable content includes: i) identifying portions of the individually retrievable content residing in the window of viewing, and ii) adjusting the sequential order to retrieve the identified portions of the individually retrievable content needed to populate the window of viewing prior to retrieving individually retrievable content needed to populate a region of the rendition outside the window of viewing.

30. The method as in claim 26, wherein utilizing the input includes:
dynamically ranking the sequential order of retrieving the multiple portions of individually retrievable content based on the input.

31. A system comprising:
a computer device to control a display screen, the computer device operable to:
communicate a request for retrieval of content to a server resource;
in response to communicating the request, receive content display information defining how to produce a rendition of the requested content for display on the display screen, the content display information indicating multiple portions of individually retrievable content in which to populate the rendition of the requested content;
utilize priority information to select a sequential order of retrieving the multiple portions to populate the rendition of the requested content; and
as specified by the sequential order, retrieve the multiple portions of individually retrievable content.

32. The system as in claim 31, wherein the computer device is further operable to:
dynamically update the priority information to populate the rendition of requested content based on which less-than-all portion of the rendered content has been selected for viewing on the display screen by a user.

33. The system as in claim 31, wherein the priority information indicates to retrieve first portions of the multiple portions of individually retrievable content needed to populate a currently viewed less-than-all portion of the rendition of requested content on the display screen, the priority information indicating that the first portions are higher in priority than second portions of the multiple portions of individually retrievable content needed to populate a less-than-all portion of the rendition of requested content currently not viewed on the display screen.

34. The system as in claim 31, wherein the rendition of the content is a webpage repeatedly retrieved by a user viewing the display screen on prior occasions of retrieving the content; and
wherein the priority information is generated based on a prior history of the user repeatedly viewing a same respective portion of the retrieved webpage.

35. The system as in claim 34, wherein the computer device is further operable to:
utilize the location of the window to identify a set of individually retrievable portions of content to be displayed in the window; and
retrieve the identified set of individually retrievable portions of the content to populate the display screen.

36. The system as in claim 31, wherein the computer device is further operable to:
produce a template as specified by the content display information; and
in accordance with the priority information, populate the template with the multiple portions of individually retrievable content to produce the rendition of the requested content.

37. The system as in claim 31, wherein a user viewing the display screen produces input selecting a window of the rendered content to be displayed on the display screen, the computer device further operable to:

produce the priority information indicating the sequential order of retrieving the multiple portions of individually retrievable content based on a location of the window of the rendered content selected by the user.

38. The system as in claim 31, wherein the computer device is further operable to:

detect a newly selected less-than-all portion of the rendition for viewing on the display screen; and update the priority information to change a priority of retrieving the multiple portions of individually retrievable content based on which less-than-all portion of the rendition is newly selected by the user for viewing on the display screen.

39. The system as in claim 31, wherein the priority information ranks the multiple portions of individually retrievable content based at least in part on a quantity of data to be retrieved to render a respective portion of the multiple portions.

40. The system as in claim 31, wherein the priority information is user-configurable.

41. The system as in claim 31, wherein the computer device is further operable to:

produce the priority information based on a location of a cursor displayed on the display screen, the location of the cursor controlled by a user viewing the display screen.

42. Computer-readable storage hardware having instructions stored thereon, the instructions, when carried out by computer processor hardware, cause the computer processor hardware to:

communicate a request for retrieval of content to a server resource, the request communicated from a computer device operated by a user;

in response to communicating the request, receive content display information defining how to produce a rendition of the requested content for display on a display screen of the computer device, the content display information indicating multiple portions of individually retrievable content in which to populate the rendition of the requested content; and utilize priority information to select a sequential order of retrieving the multiple portions of individually retrievable content as specified by the content display information;

as specified by the sequential order, retrieve the multiple portions of individually retrievable content; and via the retrieved multiple portions of individually retrievable content, populate the rendition of the requested content on the display screen.

\* \* \* \* \*